United States Patent
Okada et al.

(10) Patent No.: US 6,753,905 B1
(45) Date of Patent: Jun. 22, 2004

(54) CIRCUIT FOR TRANSMITTING A SOLID-STATE IMAGE PICKUP DEVICE SIGNAL TO A SIGNAL PROCESSOR

(75) Inventors: Fujio Okada, Omiya (JP); Itsuji Minami, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/161,500

(22) Filed: Sep. 28, 1998

(30) Foreign Application Priority Data

Sep. 29, 1997 (JP) .............................................. 9-281397

(51) Int. Cl.[7] .......................... H04N 5/232; H04N 13/00
(52) U.S. Cl. ..................... 348/211.14; 348/45; 348/374
(58) Field of Search ........................ 348/45, 46, 207.1, 348/222.1, 229.1, 373–375; 600/149, 151, 152, 443

(56) References Cited

U.S. PATENT DOCUMENTS

| | | | | |
|---|---|---|---|---|
| 4,795,962 A | * | 1/1989 | Yanagawa ................... | 324/611 |
| 4,879,522 A | * | 11/1989 | Mattfeld ...................... | 330/263 |
| RE33,816 E | * | 2/1992 | Nagasaki ..................... | 600/443 |
| 5,278,656 A | * | 1/1994 | Hynecek ................ | 348/207.99 |
| 5,376,960 A | * | 12/1994 | Wurster ....................... | 348/76 |
| 5,531,664 A | * | 7/1996 | Adachi ........................ | 600/149 |

* cited by examiner

*Primary Examiner*—Ngoc-Yen Vu
(74) *Attorney, Agent, or Firm*—Snider & Associates; Ronald R. Snider

(57) ABSTRACT

The circuit according to the present invention is a signal transmission circuit for a solid-state image pickup device which performs favorable signal transmission by suppressing heat production around an image pickup device to a minimum level. This circuit is used for transmitting video signals output from a CCD to a signal processor of a processing unit by way of a transmission line, and comprises, at a stage subsequent to the CCD, a complementary circuit composed of two current controlling diodes, a first transistor, a second transistor and a plurality of resistors. This complementary circuit operates the first transistor and the second transistor alternately, thereby outputting video signals from the CCD as positive and negative signals taking 10 V, for example, as standard. Such an operation of class B eliminates a necessity to supply a bias current, thereby preventing heat production from the transistors and resistors due to application of a bias current.

3 Claims, 3 Drawing Sheets

CIRCUIT FOR TRANSMITTING A SOLID-STATE IMAGE PICKUP DEVICE SIGNAL TO A SIGNAL PROCESSOR

BACKGROUND OF THE INVENTION

This application claims the priority of Japanese Patent Application No. 9-281397 filed on Sep. 29, 1997 which is incorporated herein by reference.

1. Field of the Invention

The present invention relates to an arrangement of a signal transmission circuit for a solid-state image pickup device, and more specifically a configuration of a transmission circuit which transmits video signals obtained with a solid-state image pickup device to a signal processor unit or the like several meters apart therefrom.

2. Description of the Prior Art

An electronic endoscope system comprises a CCD (charge coupled device) which is a solid-state image pickup device built in a tip of an electronic endoscope used as a scope, picks up an image in an observed body with the CCD and displays the image on a TV monitor or the like. An electronic endoscope system of this kind has a configuration wherein the electronic endoscope is connected to the processor unit through a cable so that the CCD is connected to a signal processing circuit in the processor unit by way of a transmission line 2 to 3 m long. Therefore, a signal transmission circuit is used to transmit video signal outputs of the CCD favorably with no loss.

BRIEF SUMMARY OF THE INVENTION

Object of the Invention

To transmit signals favorably while taking degradation of an S/N ratio into consideration, the applicant proposed a signal transmission circuit of cascade connection, for example, as that shown in FIG. 3 in a U.S. patent filed on Jun. 26, 1998. In FIG. 3, an electronic endoscope 1A is connected to a processor unit 3A by way of a transmission line (cable) 2, a CCD 4 is disposed in a tip of the electronic endoscope 1A, a CCD driver 5 and a CCD bias circuit 6 are connected to the CCD 4 so that the CCD bias circuit 6 supplies a bias voltage to the CCD 4 and the CCD driver 5 drivers the CCD 4 to reads out electric charges accumulated in the CCD as video signals.

An output transistor 8 is disposed to output the video signals obtained with the CCD 4 to the transmission line 2. The transistor 8 has a base which is connected to an output side of the CCD 4, an emitter which is grounded by way of a bias resistor R1 and a collector which is connected directly to the transmission line 2.

On the other hand, disposed on a side of the processor unit 3A is an input transistor 9 which has an emitter connected to the transmission line 2, a base grounded by way of a DC power source 10 and a collector connected to a voltage source +Vcc by way of a resistor R2. This transistor 9 functions as an base follower. Further, a buffer transistor 11 is connected to a connection point between the collector of the transistor 9 and the resistor R2, an emitter of this transistor 11 is grounded by way of a resistor R3, and a signal processing circuit 12 is disposed at a connection point between the emitter and the resistor R3.

Calculating from an input signal of the output transistor 8 and an output signal of the input transistor 9 obtained in the configuration described above, a gain G of the output voltage of the transistor 9 relative to the input voltage of the transistor 8 is determined as G=R2/R1.

The output transistor 8, the transmission line 2, the input transistor 9 and the DC power source 10 compose the so-called cascade connection which allows the video signals to be transmitted as current variations. Speaking more concretely, the transmission line 2 which is connected to the emitter of the transistor 9 has extremely low AC impedance, thereby allowing no AC voltage to be generated therein and transmitting signals as current variations taking a bias current as standard. This configuration is capable of preventing an S/N ratio and a frequency characteristic from being degraded due to variations of a signal voltage transmitted through the transmission line 2.

In the circuit shown in FIG. 3, however, it is necessary to incessantly supply the bias current for an operation of class A, whereby more or less heat is produced from the transistor 8 and the resistor R1 in an output section of the CCD 4. It is preferable to reduce this heat as far as possible since it accelerates heating of the tip of the endoscope and constitutes a cause for noise.

The present invention has been achieved in view of the problem described above and has an object to provide a signal transmission circuit for a solid-state image pickup device which is of a type different from the signal transmission circuit proposed by the above-mentioned U.S. patent and is capable of favorably transmitting signals while suppressing heat production to a minimum level around the image pickup device.

SUMMARY OF THE INVENTION

To accomplish the object described above, an invention as claimed in claim 1 provides a signal transmission circuit for a solid-state image pickup device which is used for transmitting output video signals from a solid-state image pickup device to a signal processor by way of a transmission line, characterized in that a complementary circuit which performs an operation of class B by alternately operating two transistors is disposed as a signal output circuit on a side of the solid-state image pickup device.

An invention as claimed in claim 2 provides a signal transmission circuit for a solid-state image pickup device, characterized in that the solid-state image pickup device is connected to a ceramic circuit board, and a signal output circuit which comprises the complementary circuit is configured as an integrated circuit and mounted directly on the ceramic circuit board.

In the configuration described above wherein the two transistors of the complementary circuit operate alternately, video signals are output from the solid-state image pickup device as positive and negative signals taking 0 V (a bias voltage may be applied), for example, as standard. Such an operation of class B does not supply a bias current unlike the operation of class A, thereby preventing heat production from the transistors and resistors mentioned above due to application of a bias current.

When the complementary circuit is mounted directly on the ceramic circuit board, it is also possible, owing to a heat radiating effect of the ceramic circuit board, to efficiently radiate heat produced due to signal transmission other than the heat produced due to application of the bias current, thereby preventing surroundings of the solid-state image pickup device and the tip from being heated.

DETAILED DESCRIPTION OF THE PREFERRED EMBODIMENTS

Figure 1:
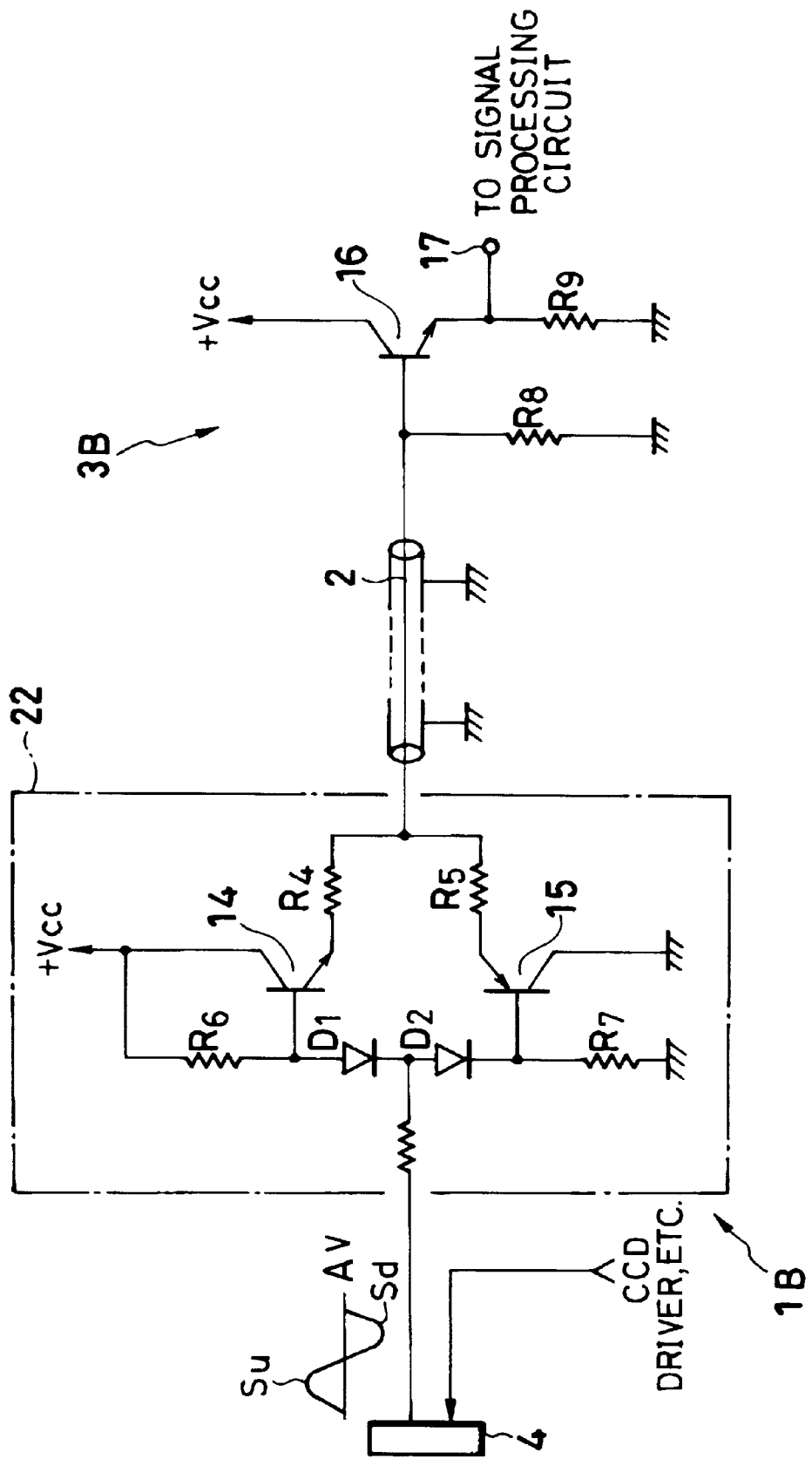
FIG. 1 is a circuit diagram illustrating a configuration of an embodiment of the signal transmission circuit for a solid-state image pickup device according to the present invention.

FIG. 1 shows an arrangement of an embodiment of the signal transmission circuit for a solid-state image pickup device, wherein an electronic endoscope 1B is connected to a processor unit 3B in the conventional manner by way of a transmission line (cable) 2 which is 2 to 3 m long. A CCD 4 is disposed in a tip of the electronic endoscope 1B and electric charges accumulated in the CCD 4 are read out as video signals by driving a CCD driver or the like.

Disposed at a stage subsequent to the CCD 4 is a complementary push-pull circuit (complementary circuit) which is composed of diodes D1, D2, a first transistor (NPN type transistor) 14 which is an output transistor, a second transistor (PNP type transistor) 15 and resistors R4 through R7 (R4=R5). Speaking more concretely, the diodes D1 and D2 are connected to branches of an output line of the CCD 4, a base of the first transistor 14 is connected to the diode D1. The first transistor 14 has an emitter which is connected to the transmission line 2 by way of the resistor R4 and a collector which is connected to a voltage source +Vcc.

The second transistor 15 has a base which is connected to the diode D2, an emitter which is connected to the transmission line 2 by way of the resistor R5 and a collector which is grounded. When the CCD 4 outputs a DC bias voltage of A (+Vcc<A<0) V, for example, the complementary circuit supplies a half-cycle signal (Su) on a positive side of A V (standard voltage) to the transmission line 2 by way of the diode D1, the first transistor 14 and the resistor R4, and a half-cycle signal (Sd) on a negative side of A V to the transmission line 2 by way of the diode D2, the second transistor 15 and the resistor R5.

On the other hand, disposed on a side of the processor unit 3B are a resistor R8 (an impedance matching resistor, R8=R4=R5) which is connected between the transmission line 2 and ground, and an input transistor 16 which has a base connected to the transmission line 2. A voltage source Vcc is connected to a collector of the transistor 16, a resistor R9 is interposed between an emitter of the transistor 16 and ground, and a signal processing circuit is connected to an output terminal 17 on the emitter of the transistor 16.

Figure 2A:
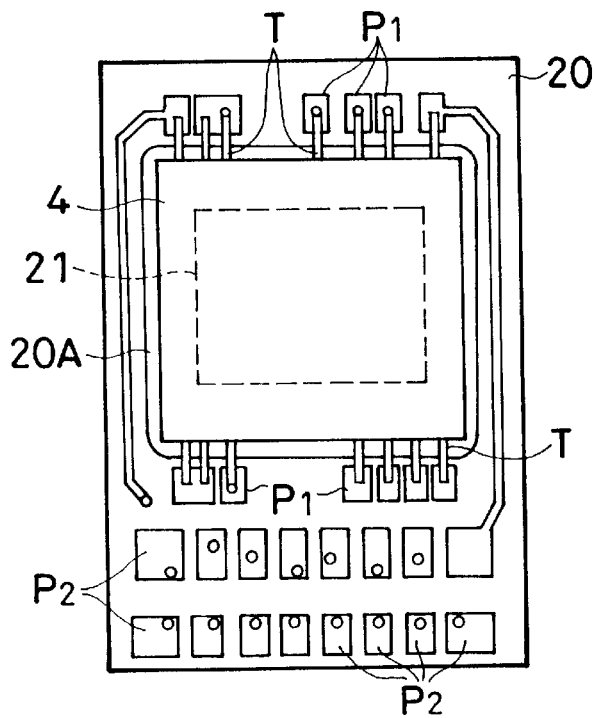
FIG. 2(A) is a top view illustrating a circuit board on which the solid-state image pickup device shown in FIG. 1 is mounted an complementary circuit is formed.
Figure 2B:
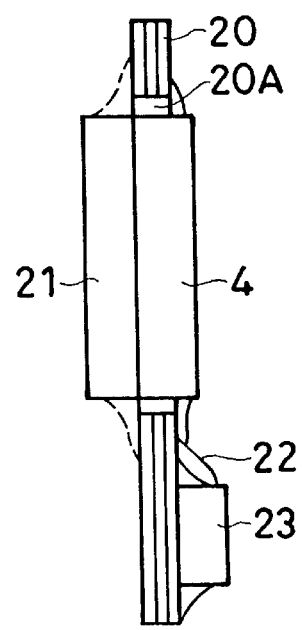
FIG. 2(B) is a side view of the circuit board shown in FIG. 2(A)
Figure 2C:
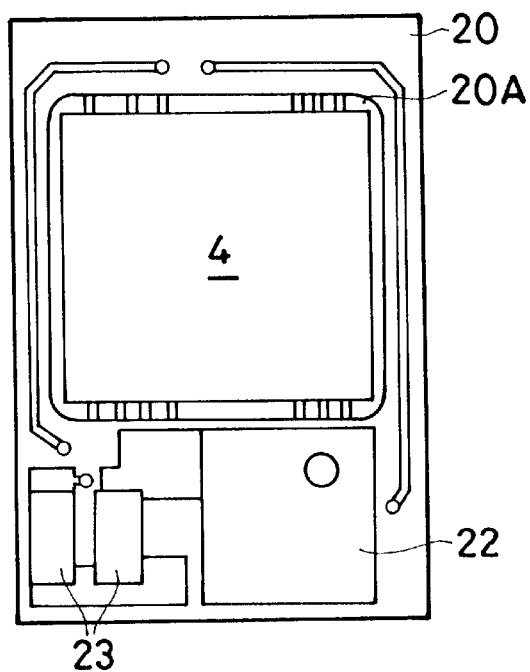
FIG. 2(C) is a rear view of the circuit board shown in FIG. 2(A)
Figure 3:
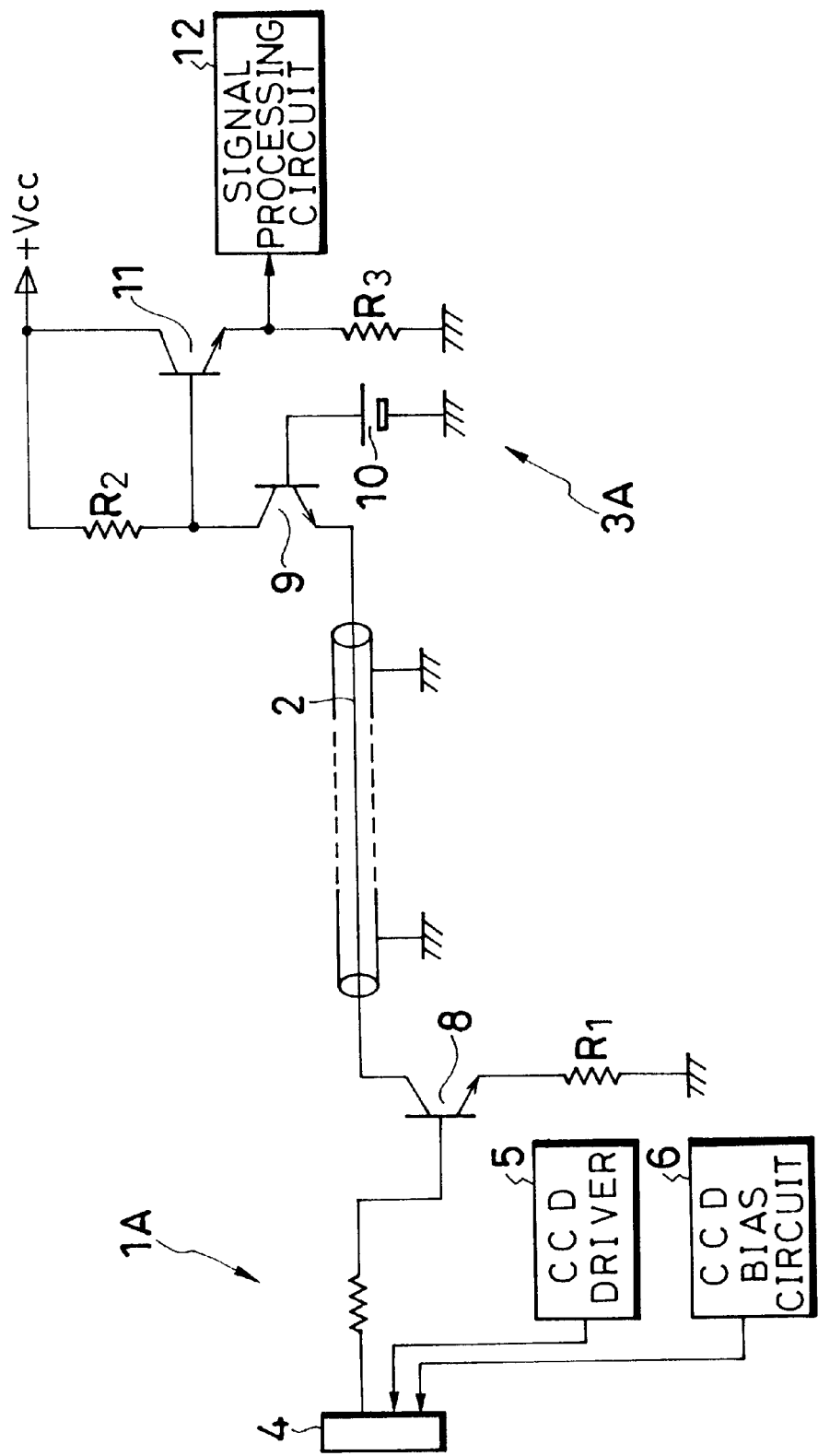
FIG. 3 is a circuit diagram illustrating another configuration of the signal transmission circuit for a solid-state image pickup device.

FIGS. 2(A) through 2(C) show a configuration of a circuit board on which the complementary circuit and a solid-state image pickup device are mounted. In FIGS. 2(A) through 2(C), a CCD 4 is mounted on a circuit board (laminated body) 20 made of a ceramic and a cover glass plate 21 is cemented to an image pickup surface (top surface) of the CCD 4. Speaking more concretely, the CCD 4 is disposed in an opening 20A formed in the circuit board 20 and terminals T of the CCD 4 are connected to terminals P1 of the circuit board 20 as shown in FIG. 2(A). The terminals P1 are connected to signal line connecting terminals P2 by way of wirings including through holes. Since the CCD 4 which is accommodated in the opening 20A is fixed with a molding resin, the circuit board 20 has also a function of a package.

Various circuit elements including the complementary circuit described above are formed on a rear surface of the circuit board 20 as shown in FIG. 2(C). Speaking concretely, formed in an IC section 22 shown in this drawing are diodes D1, D2, transistors 14, 15, resistors R4 through R7 and so on, and the IC section 22 is mounted directly on the ceramic circuit board 20. That is, the IC section 22 is composed by directly bonding an integrated circuit or forming resistors and elements directly on the circuit board 20. A capacitor 23, etc. are attached to the IC section 22 as occasion demands, and output lines of the IC section 22 are connected to the terminals P2 on the front surface of the circuit board 20.

In the embodiment which has the configuration described above, the complementary circuit shown in FIG. 1 transmits the signals (Su) which are on the positive side of A V taken as standard out of video signals output from the CCD 4 while the first transistor 14 is kept on or the signals (Sd) which are on the negative side of A V while the second transistor 15 is kept on. Though the DC bias voltage of A V is applied to the output of the complementary circuit (connection point between the resistors R4 and R5) as described above, this bias voltage application causes nearly no current consumption. Accordingly, the embodiment does not supply a bias current unlike the conventional signal transmission circuit which applies a bias current for the operation of class A, thereby allowing no heat to be produced from each circuit element due to application of the bias current and making it possible to prevent heating of a tip and lower a noise level.

Since the complementary circuit is mounted directly on the circuit board 20, the ceramic exhibits a radiating effect to efficiently disperse heat produced during transmission of video signals, thereby also preventing surroundings of the solid-state image pickup device and the tips from being heated.

The configuration of the complementary circuit adopted for the embodiment described above is only an illustrative example, and it is possible to adopt for the complementary circuit another configuration wherein other kinds of transistors are used, for example, as the first and second transistors 14 and 15.

As understood from the foregoing description, the present invention eliminates the necessity to supply a bias current and makes it possible to prevent heat from being produced from transistors and resistors used in an output section. As a result, the present invention provides merit to make it possible to prevent surroundings of an image pickup device and a tip from being heated, and improve an S/N ratio.

By configuring the complementary circuit as an integrated circuit and mounting it directly on a ceramic circuit board, it is further possible to reduce accumulation of heat produced by the complementary circuit with the heat radiating effect of a ceramic, thereby suppressing heating of surroundings of an image pickup device.

What is claimed is:

1. A signal transmission circuit, for a solid-state image pickup device comprising:

a transmission line for transmitting output video signals from a solid-state image pickup device to a signal processor;

a signal output circuit which is composed of a complementary circuit performing and operation of class B by alternately operating two transistors, receives the video signals output from said solid-state image pickup device and outputs the signals to the transmission line while suppressing heat production around the image pickup device; and an input transistor disposed in said signal processor,
wherein said signal transmission circuit uses, as said signal output circuit, a complementary push-pull circuit comprising:
  a first transistor and a second transistor which are to be operated alternately, and
  a group of diodes which extract a current on a positive side of a voltage taken as standard to supply the current to said first transistor and extract a current on a negative side of the standard voltage to supply the current to said second transistor.

2. A signal transmission circuit for a solid-state image pickup device according to claim 1,
wherein said solid-state image pickup device is connected to a ceramic circuit board and
wherein said signal output circuit comprising said complementary circuit is configured as an integrated circuit and mounted directly on said ceramic circuit board.

3. A signal transmission circuit for a solid-state image pickup device of an electronic endoscope, wherein a signal output circuit comprising a complementary circuit in accordance with claim 1 is applied to an electronic endoscope.

* * * * *